Aug. 9, 1955 E. KNAUTZ 2,714,896
MULTIPLE SAFETY VALVE ARRANGEMENT
Filed Feb. 1, 1954 3 Sheets-Sheet 1

INVENTOR.
Emil Knautz

BY
ATTORNEY

Aug. 9, 1955

E. KNAUTZ 2,714,896

MULTIPLE SAFETY VALVE ARRANGEMENT

Filed Feb. 1, 1954

INVENTOR.
Emil Knautz

BY

ATTORNEY

United States Patent Office 2,714,896

Patented Aug. 9, 1955

2,714,896

MULTIPLE SAFETY VALVE ARRANGEMENT

Emil Knautz, Hartsdale, N. Y., assignor to Combustion Engineering, Inc., New York, N. Y., a corporation of Delaware Application February 1, 1954, Serial No. 407,271

5 Claims. (Cl. 137—512.1)

This invention relates to safety valves and particularly to a multiple safety valve for use with modern high capacity steam generators.

Because of the trend toward ever increasing capacities of present day steam generators the problem of providing adequate safety valves for these generators at a reasonable cost has become acute. These valves are positioned along the steam and water drum of the generator with an average valve having a relieving capacity of approximately 200,000 lbs. of steam per hour. Thus with a 1,500,000 lbs. per hour steam generator it would be necessary to position approximately eight of these valves along this drum. This would involve considerable expense since not only would it necessitate providing eight openings through the very thick wall of the drum but would also require complex designing of much of the other equipment associated with the drum or lengthening the drum in order to accommodate this large number of valves since the available space for safety valves on these drums due to the location of the drums and the interconnection of other elements of the boiler with the drums is extremely limited.

The present invention comprises in general a multiple safety valve organization which has a single connection to the boiler drum thereby providing a large relieving capacity while occupying a minimum of space along the surface of the drum and which is constructed so that there will be no bending moment set up at this connection as a result of the passing of steam through the valve organization incident to relieving excessive boiler pressures. The multiple valve includes a pair of parallel conduits one of which is disposed eccentrically within the other thereby forming an eccentric annular passage for steam flow. The inner conduit has closed ends and is constructed to withstand the full pressure within the steam generator. A row of openings is provided along the length of the inner conduit so as to open directly into the widest portion of the annular passage and each of these openings is provided with a safety valve. Each of these valves has a stem which extends radially outward through the widest portion of the annular passage and through the wall of the outer conduit in a manner to prevent fluid leakage but permit limited tilting of the steam relative to this wall. The portion of the stem extending outwardly of the outer conduit has an adjustable spring means associated therewith for biasing the valve to its closed position. The inner conduit is supplied by fluid pressure from the steam generator and is secured within the outer conduit by means of an inlet pipe or nozzle which is connected to the inner conduit at its midpoint and extends radially therefrom through the wall of the outer conduit being secured to said wall at the location where it extends therethrough.

It is an object of the present invention to provide a multiple safety valve of large capacity particularly adapted for use with modern high capacity steam generators and which is economical to manufacture, requires a minimum of space, and is free of excessive operating stresses.

Other and further objects of the invention will become apparent to those skilled in the art as the description proceeds.

With the aforementioned objects in view, the invention comprises an arrangement, construction and combination of the elements of the valve organization in such a manner as to attain the results desired as hereinafter more particularly set forth in the following detailed description of an illustrative embodiment, said embodiment being shown by the accompanying drawing wherein.

Figures 1, 2:
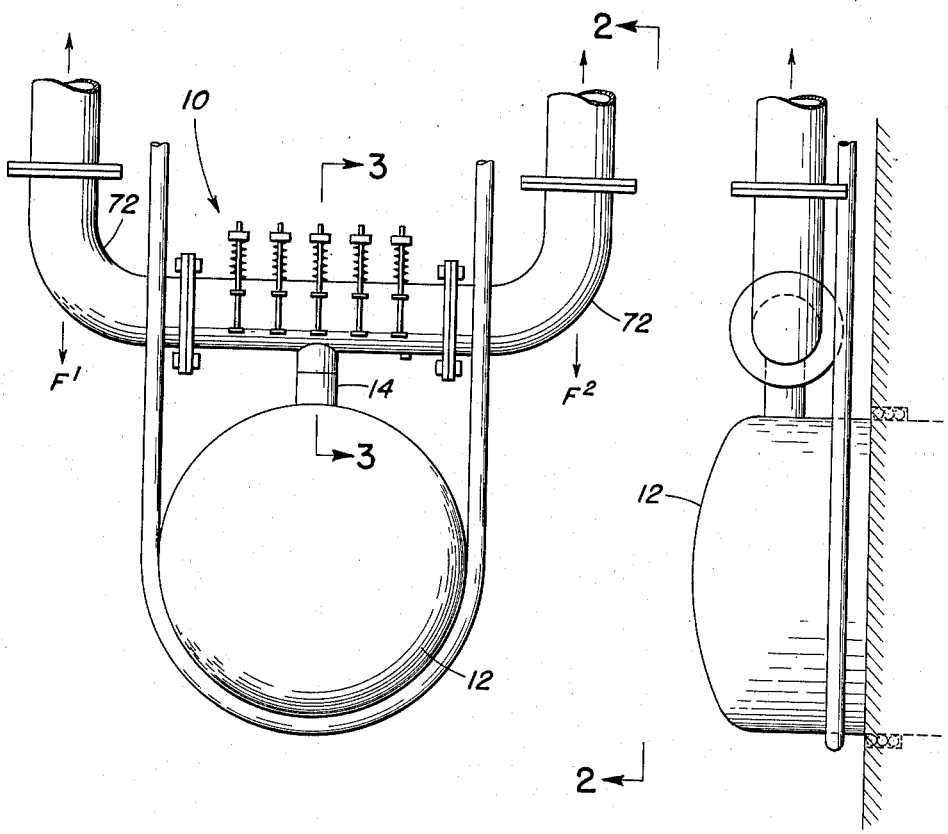
Figure 1 is an elevational view showing the multiple valve of this invention mounted on the end of a boiler drum.
Figure 2 is a side elevational view of the organization of Fig. 1 taken generally from line 2—2 of Fig. 1.
Figure 5:
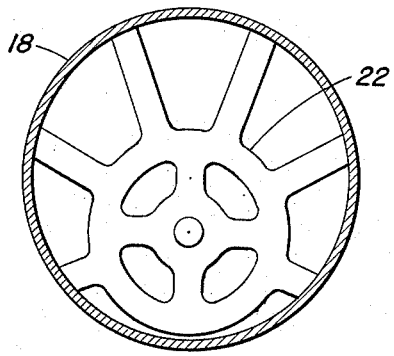
Figure 5 is a sectional view taken generally along 5—5 of Fig. 4 and showing the construction of the spider employed to position the inner conduit within the outer conduit.

Referring now to the drawing, where like reference characters are used throughout to designate like elements, the multiple safety valve generally designated 10, is shown interconnected with boiler drum 12 by means of inlet pipe 14 through which steam is conveyed from the drum into the valve enabling the valve to relieve any excess pressure developed by the boiler of which drum 12 is a part.

Valve 10 includes inner conduit 16 which is connected at its midpoint with the radially disposed inlet pipe 14 so that the pressure within conduit 16 is the same as that within boiler drum 12. Positioned about inner conduit 16 and in parallel relation therewith is outer conduit 18. These two conduits are eccentrically arranged with conduit 16 positioned in the lower portion of conduit 18 thereby forming the eccentric annular passage 20. The relative positions of the conduits are fixed by welding conduit 14 to the wall of conduit 18 where it projects therethrough and by means of spiders 22 which are secured to the inner wall of conduit 18 and the axial projections 24 of conduit 16 with these spiders being sufficiently flexible to permit limited relative axial movement of the two conduits and being provided with openings for the passage of fluid through conduit 18.

Figure 3:
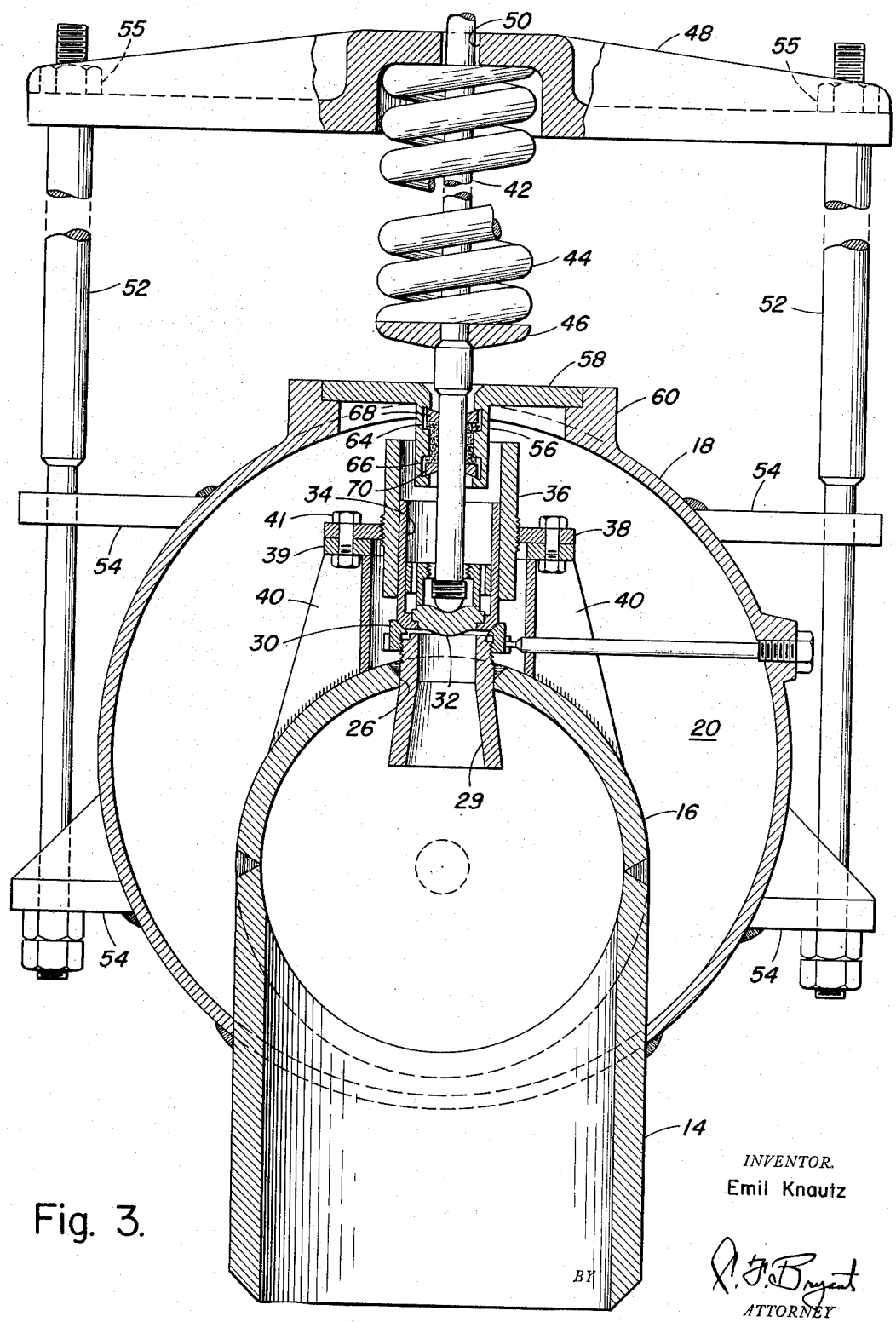
Figure 3 is a sectional view taken along line 3—3 of Fig. 1 and showing in detail the construction of each of the valves and the eccentric disposition of the inner conduit within the outer conduit.
Figure 4:
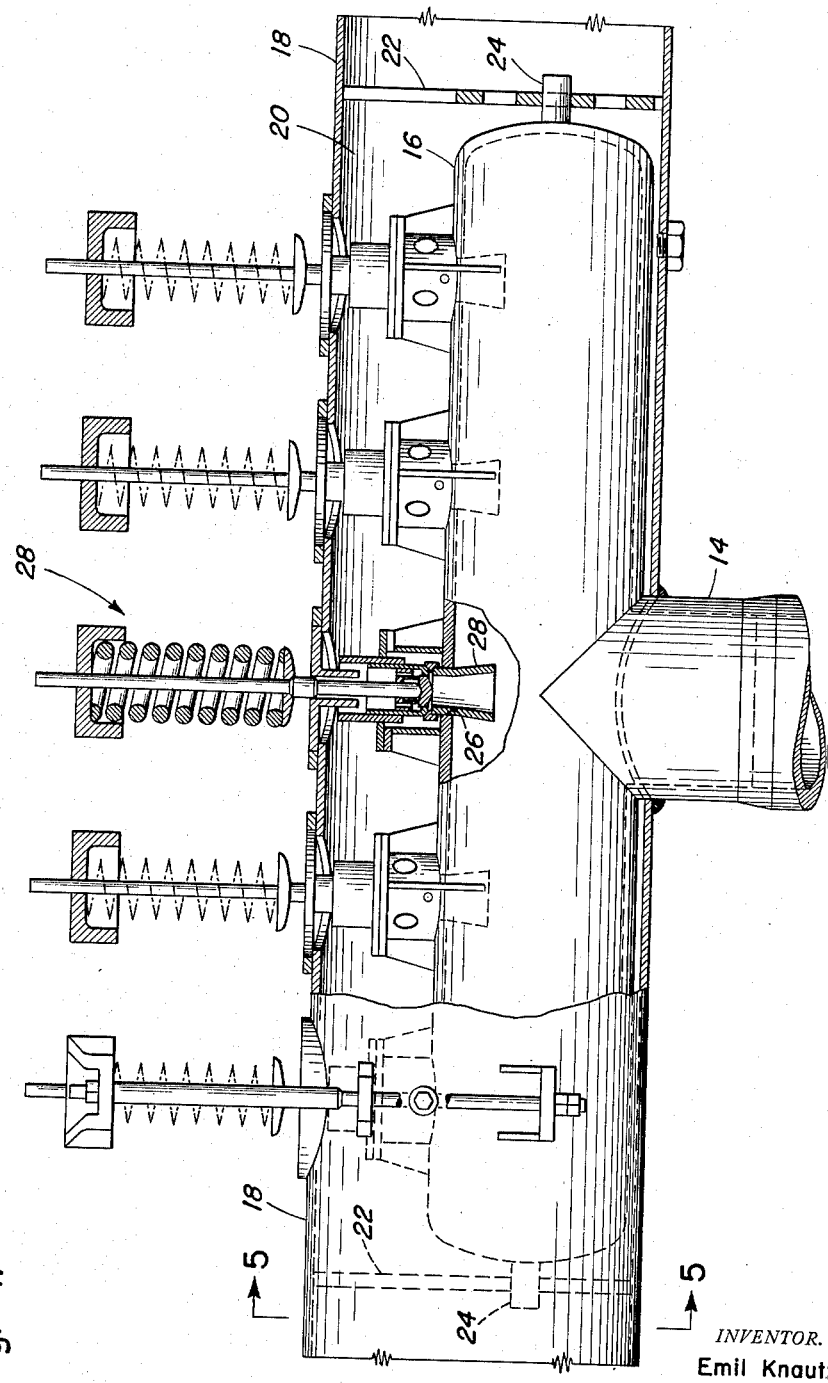
Figure 4 is a somewhat detailed view of the multiple valve organization with portions thereof broken away to show the detailed construction thereof.

Along the top of inner conduit 16 is a row of spaced openings 26 (five being shown) which lead into the widest portion of annular space 20 and each of which has one of the safety valves generally designated 28 associated therewith. While the details of the safety valve which may be employed for controlling the flow through each of the openings 26 may vary considerably, a highly satisfactory valve for this purpose is that disclosed in Figs. 3 and 4 and which is generally similar to that disclosed in U. S. Patent 2,628,632 issued to R. W. Dayton on February 17, 1953.

This valve includes inlet bushing 29 secured within opening 26 and provided with external threads for the reception of the adjustable blow down ring 30. Directly above bushing 29 and in fluid tight engagement with the seat formed on the blow down ring is the valve head which comprises disc member 32 and skirt member 34, the latter being arranged to slide within sleeve 36. Threadedly received on sleeve 36 is ring member 38 which is supported on flange 39 and secured thereto by bolts 41, this flange being secured to the upper ends of lugs 40 which are welded to and extend upwardly from inner conduit 16.

Extending upwardly from disc 32 is stem 42 by means of which the valve head is urged to its closed position in engagement with the seat formed on blow down ring 30. The biasing force for the valve is provided by spring 44 which is compressed between washer member 46 and transversely extending bar 48, the latter being provided with opening 50 through which stem 42 projects. This bar is restrained from upward movement and retained in its proper position by means of vertically extending support members 52 which pass through suitable openings provided in the laterally extending lugs 54 with adjustment of the tension of spring 44 and accordingly the pressure at which the valve will open being readily achieved through the medium of nuts 55 threaded on the upper end of each of the support members 52.

Since the inner conduit 16 will have a much higher temperature than the outer conduit 18 due to the fact that the inner conduit will have steam therewithin while the outer conduit normally will not, provision must be made for a limited amount of differential expansion between these two conduits. Due to the fact that the conduits are rigidly secured together at their midpoint by both being secured to inlet pipe 14, the axial differential expansion of these two conduits will take place in both directions from this central point with there obviously being no axial differential movement at this central point. It is thus necessary that the valves located outwardly of this central point be arranged so that their stems can tilt sufficiently to accommodate this differential movement. This is achieved in the organization of the invention by providing limited universal movement between the lower end of stem 42 and valve disc 32 and by constructing the seal means for the stem where it passes through conduit 18 so as to permit limited lateral movement of the stem with respect to the conduit.

This seal means includes a downwardly extending cylindrical member 56 which is provided with a flange 58 secured within upstanding annular boss 60 projecting upwardly from conduit 18. Extending axially through cylindrical member 56 is a cylindrical passage which is provided with spaced annular relieved portions 64 and 66 within which are disposed the expansible rings 68 and 70. Intermediate rings 68 and 70 is positioned a suitable flexible packing material which, together with these rings, permit stem 42 to move laterally a limited distance within cylindrical member 56.

Thus when the ends of inner conduit 16 expand relative to outer conduit 18 as when steam initially enters conduit 16 incident to starting of the steam generator, the valve stems of the valves located outwardly of the center of conduit 16 will tilt slightly to accommodate this differential movement of the conduits. This tilting movement of the valve stem is rather small, however, and is not sufficient to affect the setting at which the valve will open.

Since the opening of one or more of the valves 28 will result in the discharge to atmosphere of large quantities of very high temperature steam it is necessary, in order to protect personnel and for various other reasons, to convey this steam to a remote point before discharging it into the atmosphere. For this reason conduit 18 includes a pair of upwardly bent elbows 72 equally spaced from the connection of the conduit with inlet pipe 14 with the ends of the conduit that extend from these elbows disposed in a common plane containing the axis of the pipe 14 and being directed upwardly to a remote point such as through the roof of a boiler house. By having valves 28 discharge into annular chamber 20, and with elbows 72 spaced equal distances from inlet pipe 14 and the ends of conduit 18 directed upward in a plane containing the axis of pipe 14 there will be no moment developed tending to rotate the multiple valve assembly about its connection with drum 12 incident to the opening of the valves 28.

When these valves are opened steam will flow therethrough and enter chamber 20 and then flow in both directions through conduit 18 to the point of discharge to atmosphere. The only reactive force created by this steam flow will be a downward force at each of the elbows, this force being represented by $F^1$ and $F^2$ in Fig. 1. However, since the moments set up by these forces tending to rotate multiple valve 10 about its connection with drum 12 will be equal and opposite the net effect of these forces will merely be a direct downward force acting through the axis of inlet pipe 14 which will of course not cause any excessive stresses to be set up at the connection of the multiple valve with the drum.

In order to positively insure that the flow in both directions through conduit 18 and the flow through the two elbow portions of this conduit is the same, the valves 28 that are equally spaced from the midpoint of conduit 16 are adjusted to open at the same pressure within the conduit 16.

In operation steam from boiler drum 12 passes through inlet conduit 14 into the inner high pressure conduit 16. Each of the pressure relief valves connected to this inner conduit are adjusted so as to open at a predetermined pressure within conduit 16 with the centermost valve opening at one pressure, the two valves adjacent the centermost valve opening at another pressure and the outermost valves at a third pressure. As the pressure rises within conduit 16 to a point where it exceeds the various valve settings, the valves will progressively open permitting steam to pass into annular passage 20 and then flow in both directions in conduit 18 to atmosphere. Thus all of the valves will open only if those set to relieve at the lower pressure do not prevent the pressure from continuing to rise.

By locating conduit 16 eccentrically within conduit 18 sufficient room is provided for mounting valves 28 on conduit 16 while maintaining the size of these conduits at a minimum.

While I have illustrated and described a preferred embodiment of my novel valve organization it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What I claim is:

1. In an organization of the type described the combination of a conduit closed at its ends and adapted to withstand a high internal pressure, said conduit being provided with a plurality of valved openings being opened by pressure within said conduit and including valve stems extending radially outward of said conduit, an outer conduit of substantially larger diameter than said first named conduit, parallel with said first named conduit and having said first named conduit disposed therewithin, said outer conduit having openings through which said valves stems project, seal means preventing leakage around said stems where they project through said outer conduit while allowing limited tilting movement thereof relative to said outer conduit, adjustable means engaging the stem portion located outwardly of said outer conduit and effective to bias said valves to their closed position, a radially disposed inlet conduit extending through the wall of said outer conduit and connected to the first named conduit substantially centrally intermediate its ends, said outer conduit being secured to said inlet conduit where the latter extends therethrough.

2. A safety valve organization including a pair of parallel conduits one disposed eccentrically within the other thereby forming an eccentric annular passage, the inner conduit having closed ends and a row of valved openings symmetrically spaced along its length and opening directly into the widest portion of said annular passage, the valves for said openings being opened by pressure within the inner conduit and including stems extending through said widest portion of the annular passage and through the wall of the outer conduit in a manner to prevent fluid leakage but permit limited tilting of the stem relative to said wall, adjustable means engaging the stem portions located outwardly of said outer conduit and effective to bias said valves to their closed positions, an inlet conduit connected to said inner conduit to supply fluid pressure thereto and extending through and interconnected with the wall of the outer conduit.

3. A safety valve organization comprising a pair of parallel conduits one disposed eccentrically within the other with the inner one having its ends closed, a fluid pressure supply pipe leading into the inner conduit, spider means securing the ends of the inner conduit to the outer conduit while permitting at least limited longitudinal movement between the two conduits, a row of valved radial openings spaced along the inner conduit with the axes of said openings being generally in the plane containing the axes of the two conduits and with said openings extending through the wall portion of the inner conduit that is most remote from the wall of the outer conduit, the valves for said openings being opened by pressure within the inner conduit, said valves including a valve head and a stem connected thereto in a manner permitting limited universal movement therebetween, said stem extending through the wall of the outer conduit in a manner to prevent fluid leakage but permit limited tilting of the stem relative to said wall, and adjustable means engaging the stem portion located outwardly of said outer conduit and effective to bias the valve to the closed position.

4. In an organization of the type described, an outer conduit, an inner conduit having closed ends and positioned within and parallel to the outer conduit thereby forming an annular passage between the two conduits, said inner conduit having a row of valved openings symmetrically arranged along the length thereof, the valves for said openings being opened by pressure within the inner conduit with the valves that are spaced equal distances from the midpoint of the conduit being opened by substantially the same pressure, an inlet conduit radial of the inner conduit and connected thereto centrally intermediate its ends to supply fluid pressure to said inner conduit, said inlet conduit extending through and interconnected with the wall of the outer conduit.

5. A multiple safety valve comprising a first conduit having closed ends and adapted to withstand a high internal pressure, a second conduit of substantially larger diameter than said first conduit and having open ends, said second conduit being parallel with said first conduit and having said first conduit disposed therewithin thereby forming an annular passage between said conduits, said first conduit having a row of valved radial openings along its length, the valves for said openings being opened by pressure within the first conduit and each valve having a stem extending through the wall of the second conduit in a manner to prevent fluid leakage but permit limited tilting of the stem relative to said wall, adjustable means engaging the stem portions located outwardly of said second conduit and effective to bias said valves to their closed positions, a radially disposed inlet conduit connected to said first conduit centrally intermediate its ends to supply fluid pressure thereto, said inlet conduit extending through and interconnected with the wall of the second conduit, the ends of said second conduit leading to a remote point for the exhaust of fluids with the axes of said ends lying in a common plane containing the axis of the inlet conduit and being disposed at the same angle with respect to the axis of said inlet conduit.

No references cited.